United States Patent [19]

Aldrich et al.

[11] 3,922,243
[45] Nov. 25, 1975

[54] KETENE DIMER MODIFIED WATER-DISPERSIBLE THERMOSETTABLE CATIONIC RESINS

[75] Inventors: Paul H. Aldrich, Greenville; David H. Dumas, Hockessin, both of Del.

[73] Assignee: Hercules Incorporated, Wilmington, Del.

[22] Filed: Aug. 31, 1973

[21] Appl. No.: 393,690

[52] U.S. Cl.......... 260/29.2 EP; 162/164; 260/18 N; 260/24; 260/23 R; 260/29.6 R; 260/29.6 NR; 260/78 SC
[51] Int. Cl.² .................... C08L 77/06; C08G 69/48
[58] Field of Search............ 260/29.2 N, 78 SC, 24, 260/18 N, 29.2 EP, 29.6 NR

[56] References Cited
UNITED STATES PATENTS

| | | | |
|---|---|---|---|
| 2,333,914 | 11/1943 | Berchet | 260/78 SC |
| 2,387,530 | 10/1945 | Prichard | 260/78 SC |
| 3,186,900 | 6/1965 | De Young | 260/24 |
| 3,454,351 | 7/1969 | Perry | 260/78 SC |
| 3,645,954 | 2/1972 | Terada et al. | 260/78 SC |

*Primary Examiner*—Harold D. Anderson
*Attorney, Agent, or Firm*—Charles L. Board

[57] ABSTRACT

Disclosed are novel water-insoluble, water-dispersible thermosettable cationic resins derived by reaction of a water-soluble aminopolyamide, a hydrophobizing compound such as a ketene dimer and an epihalohydrin such as epichlorohydrin. The thermosettable cationic resins are water-dispersible, and aqueous dispersions thereof are stable for prolonged periods of time at relatively high solids concentration. The thermosettable cationic resins have particular utility in the sizing of paper.

4 Claims, No Drawings

KETENE DIMER MODIFIED WATER-DISPERSIBLE THERMOSETTABLE CATIONIC RESINS

This invention relates to novel water-insoluble, water-dispersible cationic thermosettable resins capable of imparting a high degree of sizing to paper and related cellulosic fibers.

Particularly, this invention relates to novel water-insoluble, water-dispersible cationic thermosettable resins derived by reacting a water-soluble aminopolyamide, a hydrophobizing compound such as a ketene dimer, and an epihalohydrin such as epichlorohydrin.

The water-soluble aminopolyamide is derived by reacting a dibasic carboxylic acid and a polyalkylenepolyamine.

The water-insoluble cationic thermosettable resins of this invention are dispersible in water at concentrations of the order of, by weight, about 8% to about 22%. The aqueous dispersions are essentially stable for prolonged periods of time up to about 12 months and longer.

The water-insoluble, water-dispersible cationic thermosettable resins of this invention will provide highly satisfactory sizing of paper under neutral conditions, under alkaline conditions, and under acid conditions. Thus, many types of paper can be sized by the use of the novel cationic thermosettable resins of this invention.

In the preparation of the aminopolyamides for use in the preparation of the resins of this invention, a dicarboxylic acid is reacted with a polyalkylenepolyamine, preferably in aqueous solution, under conditions such as to produce a water-soluble long chain aminopolyamide containing the recurring groups

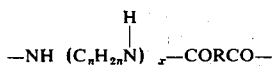

wherein R is the divalent hydrocarbon radical of the dicarboxylic acid, $n$ is an integer 2 through 6 (preferably 2 or 3), and $x$ will be an integer 2 through 4. As will be apparent, the long chain aminopolyamide will have a plurality of secondary amine groups

The dicarboxylic acids that can be used have the structural formula HOOCRCOOH where R is a divalent hydrocarbon radical. R can be a divalent aliphatic hydrocarbon radical (saturated or unsaturated), or a divalent alicyclic hydrocarbon radical, or a divalent aromatic hydrocarbon radical.

Specific examples of dicarboxylic acids that can be employed include malonic acid, succinic acid, glutaric acid, adipic acid, pimelic acid, suberic acid, fumaric acid, maleic acid, phthalic acid, terephthalic acid, and diglycolic acid. Mixtures of two or more acids can be employed if desired. The available anhydrides of any of the above acids can be employed as well as esters thereof. The preferred acids are the saturated aliphatic dicarboxylic acids containing 3 through 8 carbon atoms, that is, R in the above formula contains 1 through 6 carbon atoms.

The polyalkylenepolyamine employed in the preparation of the aminopolyamide has the structural formula

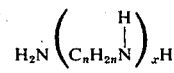

wherein $n$ and $x$ are as above defined.

A variety of polyalkylenepolyamines including polyethylenepolyamines, polypropylenepolyamines, polybutylenepolyamines and the like can be employed herein of which the polyethylenepolyamines are the preferred class. More specifically, the polyalkylenepolyamines are polyamines containing two primary amine groups and at least one secondary amine group in which the nitrogen atoms are linked together by groups of the formula $-C_nH_{2n}-$ where $n$ is as above defined.

The invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylenepolyamines obtained by the reaction of ammonia and ethylene dichloride, refined only to the extent of removal of chlorides, water, excess ammonia, and ethylenediamine, is satisfactory. Most preferred are the polyethylenepolyamines containing from two to four ethylene groups, two primary amine groups, and from one to three secondary amine groups.

The term "polyalkylenepolyamine" employed herein refers to and includes any of the polyalkylenepolyamines referred to above or to a mixture of such polyalkylenepolyamines.

Temperatures employed for carrying out reaction between the dicarboxylic acid and the polyalkylenepolyamine can vary from about 110°C. to about 250°C. or higher at atmospheric pressure. Temperatures between about 160°C. and 210°C. are preferred. Where reduced pressures are employed, lower temperatures can be utilized as is well known in the art. Reaction time will usually vary from about ½ to 2 hours, although shorter or longer reaction times can be utilized depending on reaction conditions. Reaction time varies inversely with temperature.

In carrying out the reaction, it is preferred to use an amount of dicarboxylic acid sufficient to react substantially completely with the primary amine groups of the polyalkylenepolyamine but insufficient to react with the secondary amine groups to any substantial extent. This will usually require a mole ratio of polyalkylenepolyamine to dicarboxylic acid from about 0.9:1 to about 1.2:1 and preferably from 0.92:1 to 1.14:1. However, mole ratios of from about 0.8:1 to about 1.4:1 can be used.

In preparing the novel resins of this invention, the aminopolyamide is first reacted with a compound (to be detailed more fully hereinafter and to be referred to hereafter as "hydrophobizing compound") that will produce a water-insoluble reaction product which is sometimes referred to hereinafter as a water-insoluble modified aminopolyamide or as a modified aminopolyamide. The hydrophobizing compound is a compound that will react with the secondary amine groups of the aminopolyamide to form therewith a covalent bond. The amount of hydrophobizing compound employed will be that sufficient to provide, after reaction, a water-insoluble modified aminopolyamide but insufficient to react with more than about 50% of the secondary amine groups of the aminopolyamide. Thus there will be available in the modified aminopolyamide at least about 50% of the original secondary amine groups of the aminopolyamide reactant for reaction with epihalohydrin. The preferred amount of hydrophobizing compound employed to produce the water-insoluble reaction product or water-insoluble modified aminopolyamide will be that sufficient to react with from about 10% to about 25% of the secondary amine groups of the aminopolyamide. Examples of hydrophobizing compounds are acyl halides, acid anhydrides, isocyanates, and ketene dimers. These compounds will contain a total of from about 12 to about 40 carbon atoms and preferably from about 16 to about 36.

Acyl halides that can be used have the formula R'COX where X is a halide such as chlorine, bromine, iodine, and fluorine. R' is a hydrocarbon radical (saturated or unsaturated) such as alkyl, alkenyl, aryl, and cycloalkyl. The hydrocarbon radical can be a straight or branched chain alkyl radical, an aromatic substituted alkyl radical, an aromatic radical, or an alkyl substituted aromatic radical so long as the hydrocarbon radical contains a total of from about 11 to about 39 carbon atoms and preferably from about 15 to 35 carbon atoms. Specific examples of acid halides include rosin acid chloride, myristoyl chloride, palmitoyl chloride, oleoyl chloride, and stearoyl chloride.

Acid anhydrides that can be employed include acid anhydrides having the structural formulae

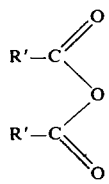

(I)

where R' is as defined above and cyclic dicarboxylic acid anhydrides having the structural formulae:

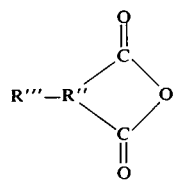

(II)

where R'' represents a dimethylene or trimethylene radical and R''' is a hydrocarbon radical containing more than 7 carbon atoms which is selected from the group consisting of alkyl, alkenyl, aralkyl or aralkenyl. Substituted cyclic dicarboxylic acid anhydrides falling within formula (II) are substituted succinic acid and glutaric acid anhydrides.

Specific examples of anhydrides of formula (I) are rosin anhydride, myristoyl anhydride, palmitoyl anhydride, oleoyl anhydride, and stearoyl anhydride.

Specific examples of anhydrides of formula (II) are isooctadecenyl succinic anhydride; n-octadecenyl succinic anhydride; n-hexadecenyl succinic anhydride; n-dodecyl succinic anhydride; iso-dodecenyl succinic anhydride; n-decenyl succinic anhydride, n-octenyl succinic anhydride; and n-heptyl glutaric anhydride.

Isocyanates that can be used have the formula R'NCO where R' is as above defined. Specific examples of such isocyanates are rosin isocyanate, octadecyl isocyanate, dodecyl isocyanate, tetradecyl isocyanate, hexyldecyl isocyanate, eicosyl isocyanate, and docosyl isocyanate.

The ketene dimers used in this invention are dimers having the formula $[R_1CH=C=O]_2$ where $R_1$ is a hydrocarbon radical, such as alkyl having at least 8 carbon atoms, cycloalkyl having at least 6 carbon atoms, aryl, aralkyl and alkaryl. In naming ketene dimers, the radical "$R_1$" is named followed by "ketene dimer". Thus, phenyl ketene dimer is:

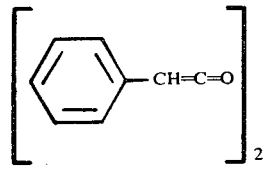

benzyl ketene dimer is:

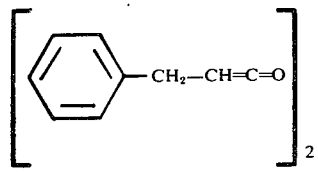

and decyl ketene dimer is: $[C_{10}H_{21}-CH=C=O]_2$. Examples of ketene dimers include octyl, decyl, dodecyl, tetradecyl, hexadecyl, octadecyl, eicosyl, docosyl, tetracosyl, phenyl, benzyl beta-naphthyl and cyclohexyl ketene dimers, as well as the ketene dimers prepared from montanic acid, naphthenic acid, $\Delta^{9,10}$-decylenic acid, $\Delta^{9,10}$-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid, and selacholeic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above-named fatty acids with each other may also be used.

The reaction of the aminopolyamide and the hydrophobizing compound is carried out under relatively mild conditions so that no untoward reaction occurs. Thus, the reaction conditions are such that the only reaction taking place is the reaction of the hydrophobizing compound with the secondary amines of the aminopolyamide whereby the secondary amines are converted into amides, ureas, beta-ketoamides or beta-amido acids, depending on the hydrophobizing compound reactant. Thus, the aminopolyamide and hydrophobizing compound are reacted under atmospheric or higher pressure, with or without a catalyst, under a nitrogen blanket at a reaction temperature of from about 0°C. to about 100°C. to produce a reaction product that is water-insoluble. Suitable catalysts, if one is employed, include tertiary amines such as triethylamine. The amount of catalyst employed will usually be, by weight, from about 0.1% to about 1% of the total weight of the reactants employed.

The water-insoluble reaction product is then reacted in aqueous medium or in a suitable solvent therefor (at a solids content of from about 10% to about 40%) with epihalohydrin, preferably epichlorohydrin, at a temperature of from about 20°C. to about 100°C. (preferably from about 50°C. to about 70°C.) for a period of time from about ½ hour to 3 hours (time varies inversely with temperature). The amount of epihalohydrin used in the reaction with the water-insoluble modified aminopolyamide resin will be that sufficient to react with the remainder of the secondary nitrogens of the modified aminopolyamide resin. Thus, the modified aminopolyamide will contain secondary amine groups. Hence, the amount of epihalohydrin employed will be at least that amount sufficient to react with substantially all the secondary amine groups of the modified aminopolyamide.

When water is employed as the reaction medium in carrying out the reaction of the modified aminopolyamide resin with epichlorohydrin, the reaction product (which is a water-insoluble thermosettable cationic resin) in its aqueous reaction medium can be homogenized to reduce the particle size of the solids. Subsequently, the pH of the resulting aqueous dispersion is adjusted to a pH of from about 5 to about 7 to provide for optimum stability of the dispersion. Stable dispersions having a solids content of from about 10% to about 22% can be made by this means.

The epihalohydrin reaction can be carried out in an organic solvent solution of the water-insoluble modified aminopolyamide resin. Suitable solvents for the modified aminopolyamide resin include methanol, ethanol, isopropanol, propanol, butanol and benzene. Mixtures of two or more solvents can be used if desired. It is to be understood that the solvent employed in non-reactive with the reactants and with the reaction product under reaction conditions.

Highly stable aqueous dispersions of the novel resinous reaction products of this invention that are prepared in solvent solution can be easily and readily prepared by the following procedure. In this instance, the solvent medium employed will be a solvent not only for the reactants but also for the reaction product. The solution of the reaction product (the reaction product dissolved in the organic solvent reaction medium) is dispersed in water with vigorous agitation such, for example, as by homogenization at pressures of from about 1000 to 5000 p.s.i. to provide an aqueous emulsion that is essentially stable. Subsequently, the organic solvent component of the resulting aqueous emulsion is removed by distillation, either under atmospheric conditions or under vacuum, to provide a stable aqueous dispersion of the reaction product.

The aqueous dispersions of the water-insoluble cationic thermosettable resins of this invention are used in the manufacture of sized paper by surface treatment after sheet formation. In addition, they can be incorporated into a pulp slurry at the wet end of the paper machine to provide sizing. The amount of resin employed in the sizing of paper will usually be from about 0.05% to about 2% by weight based on the dry weight of the pulp fibers.

The resin is applied in its thermosettable state. It is subsequently cured, as by application of heat, to its thermoset or cross-linked state. Thus, paper, sized in accordance with this invention, will contain the resin in its thermoset state. Curing or cross-linking involves a time-temperature relationship, time varying inversely with temperature. Thus, for example, the resin can be cured to its thermoset state by heating paper containing the thermosettable resin at a temperature of from about 200°F. to 250°F. for a period of from about 60 seconds to about 10 seconds. In actual practice, the conventional drum drying of the treated paper sheet will provide for sufficient curing of the resin.

The following examples are illustrative of this invention. All parts and percentages are by weight unless otherwise specified.

EXAMPLE 1

A 3-liter, 4-necked flask equipped with a mechanical stirrer, water trap (Dean-Stark) with reflux condenser, nitrogen sparge and a thermometer with a Thermo-Watch temperature controller is charged with 62.4 parts (0.61 mole) of diethylenetriamine. Ninety-two and five-tenths parts (0.63 mole) of adipic acid is slowly added through a powder funnel with good stirring. The temperature increases to 110°C. by the end of the addition. The reaction mixture is heated to 170°C. for 2 hours as 20 parts of water are collected (22.2 theory). After removing the heating mantel, about 20 parts of ethanol is added slowly through the condenser which lowers the temperature below 100°C. Then about 750 parts ethanol is added to provide a solution having a solids content of about 15%.

EXAMPLE 2

About 750 parts of the solution of Example 1 (cooled to 25°C.) is placed in a reaction vessel and a solution of 73.0 parts (0.15 mole) of a mixed hexadecyl-, tetradecyl ketene dimer from a mixture of stearic and palmitic acids in about 650 parts benzene is added dropwise. The amount of ketene dimer employed is sufficient to react with about 25% of the secondary amine groups of the aminopolyamide. This solution remains homogeneous at room temperature. The reaction mixture is heated to reflux and 42 parts (0.45 mole) of epichlorohydrin is added. After 2 hours at reflux the alcohol-benzene solution is blended into 2500 parts of distilled water. The blended dispersion is homogenized at 4000 p.s.i. in a Manton-Gaulin laboratory homogenizer. The dispersion has a pH of 9 which is lowered to about 6.5 with formic acid for stabilization. The solvent is removed on a rotary evaporator maintaining the bath temperature below 45°. The resulting product is a turbid, fine particle size aqueous dispersion having a solids content of about 9.8%.

EXAMPLE 3

The aqueous dispersion of Example 2 is applied to a waterleaf paper sheet on a size press by passing the sheet through a solution thereof in the nip. The amount of size material applied is about 0.21% by weight based on the weight of the paper. The sized paper sheet is subsequently drum dried at 220°F. for about 35 seconds. Sizing results set forth herein are determined on the Hercules Sizing Tester. The sizing test determines the resistance of the sized sheet of paper to penetration by No. 2 Test Solution (an aqueous solution of, by weight, 1.0% formic acid and 1.25% Naphthol Green B). The time necessary for ink penetration to reduce light reflectance to 80% of the sheet's initial value is used to represent the degree of sizing. The degree of sizing for this example is 235 seconds.

EXAMPLE 4

Example 1 is repeated with the exception that the amount of ethanol added to adjust the solids content (15% solids content in Example 1) is that amount sufficient to provide a solution having a solids content of about 33%.

EXAMPLE 5

To 64 parts of the solution of Example 4 (0.1 equivalent) in a reaction vessel (kept under a nitrogen sparge with magnetic stirring at room temperature) is added 9.2 parts (0.03 mole) of rosin isocyanate. As the reaction is heated to reflux, the reaction becomes homogeneous and 100 parts of ethanol is added. The solution pH is 8.7. Then, 6.7 parts (0.73 mole) of epichlorohydrin is added and the reaction heated to reflux for 1 hour. The resulting product is blended with 325 parts of distilled water and the pH thereof (which is 8) is adjusted to 6.5 with formic acid. The blend is then homogenized at 4000 p.s.i. The organic solvent portion is removed under reduced pressure leaving a 9.6% total solids aqueous dispersion. This aqueous dispersion is used to size paper in accordance with the procedure of Example 2. The degree of sizing for this example is 155 seconds.

EXAMPLE 6

64 parts of the solution of Example 4 is diluted with 50 parts of ethanol and added to a reaction vessel (kept under a nitrogen sparge with magnetic stirring at room temperature). A solution of 7.5 parts rosin acid chloride in 87 parts of benzene is added slowly at 20°C. After the addition, the reaction mass is heated to reflux and then 6.7 parts (0.075 mole) of epichlorohydrin is added and heated an additional hour at a temperature of 70°C. This product, which is homogeneous, is blended into 200 parts of distilled water and homogenized at 3000 p.s.i. and the solvents removed under reduced pressure. The pH is lowered from 7.9 to 6.5 with formic acid. The resulting aqueous dispersion (10.7% solids) is an efficient size on waterleaf paper.

It is understood that the above description and working examples are illustrative of this invention and not in limitation thereof.

What we claim and desire to protect by Letters Patent is:

1. A composition consisting essentially of an aqueous dispersion of a water-insoluble, water-dispersible thermosettable cationic resin derived by reacting (I) an epihalohydrin and (II) a water-insoluble modified aminopolyamide derived by reacting (a) a water-soluble long chain aminopolyamide derived by reaction of a polyalkylenepolyamine and a dicarboxylic acid, said aminopolyamide having recurring groups

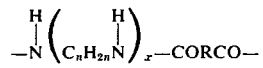

wherein $n$ is an integer 2 through 6, $x$ is an integer 2 through 4, and R is a divalent hydrocarbon radical, and (b) a ketene dimer having the formula $[R_1CH=C=O]_2$ where $R_1$ is a hydrocarbon radical selected from the group consisting of alkyl having at least 8 carbon atoms, cycloalkyl having at least 6 carbon atoms, aryl, aralkyl and alkaryl, said ketene dimer having a total of from about 16 to about 36 carbon atoms, the amount of ketene dimer employed being that sufficient to provide a modified aminopolyamide that is water-insoluble but insufficient to react with more than about 50% of the secondary amine groups of the aminopolyamide, the amount of epihalohydrin employed being at least that amount sufficient to react with substantially all the secondary amine groups of the modified aminopolyamide.

2. A composition consisting essentially of an aqueous dispersion of a water-insoluble, water-dispersible thermosettable cationic resin derived by reacting (I) epichlorohydrin and (II) a water-insoluble modified aminopolyamide derived by reacting (a) a water-insoluble long chain aminopolyamide derived by reaction of a polyalkylenepolyamine and a dicarboxylic acid, said aminopolyamide having recurring groups

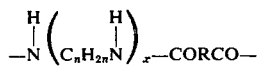

wherein $n$ is an integer 2 through 6, $x$ is an integer 2 through 4, and R is a divalent hydrocarbon radical, and (b) a ketene dimer having the formula $[R_1CH=C=O]_2$ where $R_1$ is a hydrocarbon radical selected from the group consisting of alkyl having at least 8 carbon atoms, cycloalkyl having at least 6 carbon atoms, aryl, aralkyl and alkaryl, said ketene dimer having a total of from about 16 to about 36 carbon atoms, the amount of ketene dimer employed being that sufficient to react with from about 10% to about 25% of the secondary amine groups of the aminopolyamide, the amount of epichlorohydrin employed being at least that amount sufficient to react with substantially all the secondary amine groups of the modified aminopolyamide.

3. The composition of claim 1 wherein the water-soluble long chain aminopolyamide is derived by reaction of diethylenetriamine and adipic acid.

4. The composition of claim 2 wherein the water-soluble long chain aminopolyamide is derived by reaction of diethylenetriamine and adipic acid.

* * * * *

UNITED STATES PATENT AND TRADEMARK OFFICE
CERTIFICATE OF CORRECTION

PATENT NO. : 3,922,243
DATED : November 25, 1975
INVENTOR(S) : Paul H. Aldrich & David H. Dumas (Case 1)

It is certified that error appears in the above–identified patent and that said Letters Patent are hereby corrected as shown below:

Column 8, line 28 (Claim 2) of printed patent;
"insoluble" should read --soluble--

Signed and Sealed this

Twenty-seventh Day of July 1976

[SEAL]

Attest:

RUTH C. MASON
*Attesting Officer*

C. MARSHALL DANN
*Commissioner of Patents and Trademarks*